US006816895B2

(12) United States Patent
Andreakis et al.

(10) Patent No.: US 6,816,895 B2
(45) Date of Patent: Nov. 9, 2004

(54) UPDATING THE CAPABILITY NEGOTIATION INFORMATION OF A MOBILE STATION WITH AN EDITING APPLICATION DOWNLOADED FROM A SERVICE PROVIDER

(75) Inventors: Dean W. Andreakis, Lake Villa, IL (US); Shon T. Driscoll, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 781 days.

(21) Appl. No.: 09/817,865

(22) Filed: Mar. 26, 2001

(65) Prior Publication Data

US 2002/0138545 A1 Sep. 26, 2002

(51) Int. Cl.$^7$ ............................................. G06F 15/16
(52) U.S. Cl. ...................... 709/219; 709/202; 709/203; 455/418; 455/466
(58) Field of Search ............................... 709/217–219, 709/202–203, 246; 455/418, 466; 707/10

(56) References Cited

U.S. PATENT DOCUMENTS

| 6,151,624 | A | | 11/2000 | Teare et al. .................. 709/217 |
|---|---|---|---|---|
| 6,167,253 | A | | 12/2000 | Farris et al. |
| 6,574,660 | B1 | * | 6/2003 | Pashupathy et al. ........ 709/217 |
| 2002/0046295 | A1 | * | 4/2002 | Asai ............................ 709/246 |
| 2002/0069263 | A1 | * | 6/2002 | Sears et al. .................. 709/218 |
| 2002/0091797 | A1 | * | 7/2002 | Wallenius et al. ........... 709/218 |
| 2002/0124050 | A1 | * | 9/2002 | Middeljans ................. 709/203 |
| 2002/0183080 | A1 | * | 12/2002 | Poor et al. .................. 455/466 |
| 2004/0098669 | A1 | * | 5/2004 | Sauvage et al. ............. 715/513 |

FOREIGN PATENT DOCUMENTS

WO    WO 98/21662    5/1998    ........... G06F/13/00

OTHER PUBLICATIONS

3GPP TS 23.057, 3$^{rd}$ Generation Partnership Project; Technical Specification Group Terminals; Mobile Station Application Execution Environment (MExE); Functional description; Stage 2 (Release 4), version 4.0.0, (Dec. 2000).

3GPP TS 22.057, 3$^{rd}$ Generation Partnership Project; Technical Specification Group Services and System Aspects; Mobile Station Application Execution Environment (MExE); Service description; Stage 1 (Release 4), version 4.0.0, (Oct. 2000).

WAG UAPROF, "Wireless Application Group User Agent Profile Specification", Ver. Nov. 10, 1999.

W3C PR–rdf–syntax–19990105, "Resource Description Framework (RDF) Model and Syntax Specification", Ver. Jan. 5, 1999.

Uskela, S. et al. "Service Portability Across Mobile Networks". Nokia Communicaitions, Jun. 1999, pp 1–6.

Jamadagni, S. et al. "A PUSH Download Architecture for Software Defined Radios". IEEE 2000 ICPWC, pp 404–407.

(List continued on next page.)

*Primary Examiner*—Wen-Tai Lin
(74) *Attorney, Agent, or Firm*—Brian M. Mancini

(57) ABSTRACT

An apparatus and method is provided for updating capability negotiation, in a communication system running a Mobile Station Application Execution environment (MExE), between a mobile station and a service provider network with content. The mobile station has capability negotiation information to be provided to the service provider network before content can be transferred. An editing application is resident on the service provider network. Before transfer of content to the mobile station, the editing application is downloaded to the mobile station, installed and executed to update the capability negotiation information with any changes to enable proper transfer and presentation of the content from the service provider to the mobile station.

20 Claims, 2 Drawing Sheets

OTHER PUBLICATIONS

Bos, L. et al. "An Algorithm for Automatically Selecting the Most Suitable Processing Environment for Mobile Multimedia Applications". IEEE 2000, pp 113–120.

Fasbender, A. et al. "Any Network, Any Terminal, Anywhere." IEEE Personal Communications, Apr. 1999, pp 22–30.

* cited by examiner

UPDATING THE CAPABILITY NEGOTIATION INFORMATION OF A MOBILE STATION WITH AN EDITING APPLICATION DOWNLOADED FROM A SERVICE PROVIDER

FIELD OF THE INVENTION

The present invention relates generally to wireless communications. More particularly, the invention is directed to running Java software applications in a wireless communication system.

BACKGROUND OF THE INVENTION

Wireless communication devices such as cellular phones are becoming much more sophisticated as the technology evolves. Presently, wireless devices have the capability to not only download Internet web pages, but also to download application software. The Mobile Station Application Execution Environment (MExE) standard, such as can be found in 3GPP TS 22.057, "3rd Generation Partnership Project; Technical Specification Group Services and Systems Aspects; Mobile Execution Environment (MExE); Service description; Stage 1 (Release 4), version 4.0.0, (2000-10) and 3GPP TS 23.057, "3rd Generation Partnership Project; Technical Specification Group Terminals; Mobile Station Application Execution Environment (MExE); Functional description; Stage 2 (Release 4), version 4.0.0, (2000-12), is an evolving standard that defines a system for service providers to interface with a client's mobile station (e.g. cellular phone).

This interactive capability allows the transfer of content or executable applications between a service provider and a mobile station. However, the capabilities and display sizes presently available in mobile stations (e.g. cellular phones) are limited such that the service provider must modify the content so that the mobile station can properly view the content or execute the applications. A service provider can upgrade applications and target new applications to clients, depending on the mobile station capability. The MExE system is operable on a Global System for Mobile (GSM) communication system, as is known in the art, and utilizes a hypertext transfer protocol (HTTP) similar to that used for Wireless Application Protocols (WAP), also known in the art. Both systems are also applicable to the new Universal Mobile Telecommunication System (UMTS). However, where WAP operates with a specific subset of capabilities, such as text and graphics, MExE allows full Java, JavaPhone or the subset of personal Java (pJava) application programming.

The implementation of Java applications requires increased memory and processing requirements in a mobile station. In addition, full page Internet web pages would be difficult to show on the displays of existing mobile stations. To address this problem, the MExE system provides capability and content negotiation wherein the service provider and mobile station inform each other of the content, support and capability each has available. In order to determine if a mobile station has adequate resources, the MExE standard defines "classmarks" that define available capability, such as the capability of WAP functionality only or full-fledged Java functionality, for example.

Generally, the mobile station will indicate its capabilities and the user's preferences for content delivery to the service provider during capability negotiations before a transfer of content or applications. The user preferences are includes in a user profile. Capability negotiation includes the transfer of a resource description framework (RDF) file between a mobile station and the service provider to extract necessary capability and user preference information. Generally, the RDF file is stored in the mobile station, on a removable subscriber identification module (SIM) card, or remotely on the service provider network such as at a Uniform Resource Locator (URL) which can be pointed to by the mobile station. The RDF file contains a description of the capabilities of the mobile station, including content format along with headers and other identifiers, and allows the mobile station to conduct full capability negotiations with the service provider, as is known in the art. The RDF file can also contain the user profile such that the service provider can modify content or applications to suit the user's tastes, within the capability of the mobile station and service provider. The user profile may also be located in another file type, other than RDF.

However, mobile capability and user preferences often change. For example, users can now change mobile stations just by moving their SIM card from phone to phone. If the SIM card is carrying the RDF file, then incorrect capability information may be transferred to the service provider. In addition, a user may want to change their user profile to include completely different user preferences for a mobile station. Providing these updates requires editing software to be resident on the mobile station. Unfortunately, the mobile station has limited memory resources, and such editing software would not be utilized very often, leading to memory use inefficiencies in the mobile station.

What is needed is a method and apparatus to better utilization memory resources in a mobile station, with changing capabilities and user preferences, running in a MExE environment. Further, it would be an advantage to dynamically download applications in a mobile station. Moreover, it would be an advantage to have a mobile station that could run applications locally without the need for recompilation for specific target processors in the mobile station. Specifically, it would be advantageous to have the mobile station download and run editing software without the need for recompilation.

DETAILED DESCRIPTION OF THE PREFERRED EMBODIMENTS

Figure 1:
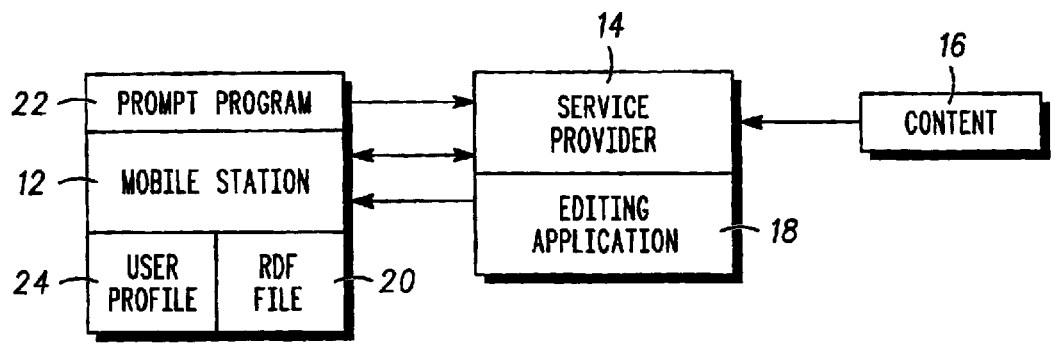
FIG. 1 illustrates a simplified block diagram of a communication system demonstrating capability negotiation updating, in accordance with the present invention.

The present invention provides a method and apparatus to free up memory resources in a mobile station running a MExE environment. The present invention advantageously uses a kJava VM (virtual machine) environment to dynamically port applications from a network service provider to a mobile station, without the need for recompilation for specific target processors in the mobile station. Specifically, the mobile station can download and run editing software from a service provider without the need for recompilation (which would take up even further memory resources) in order to edit capability negotiation information and user preferences in an RDF file. The editing software includes a parsing program to parse the RDF file to strip out the headers and other information unnecessary for capability negotiations or to define user preferences. Once the RDF file is editing, the editing software is deleted, thereby opening up about 70 kbytes in memory.

The invention will have application apart from the preferred embodiments described herein, and the description is provided merely to illustrate and describe the invention and it should in no way be taken as limiting of the invention. While the specification concludes with claims defining the features of the invention that are regarded as novel, it is believed that the invention will be better understood from a consideration of the following description in conjunction with the drawing figures, in which like reference numerals are carried forward. As defined in the invention, a radiotelephone is a communication device that communicates information to a base station using electromagnetic waves in the radio frequency range. In general, the radiotelephone is portable and is able to receive and transmit. However, the present invention is equally adaptable to any communication devices, be they wireless or wireline, that transfer data between each other.

The concept of the present invention can be advantageously used on any electronic product with data transfer. Preferably, the radiotelephone portion of the communication device is a cellular radiotelephone adapted for personal communication, but may also be a pager, cordless radiotelephone, or GSM radiotelephone. The radiotelephone portion is constructed in accordance with a known digital communication standard, such as the GSM, WCDMA or DCS standards as are known in the art, or future digital communication standards which are presently being developed. The radiotelephone portion generally includes a radio frequency (RF) transmitter, an RF receiver, memory, a digital signal processor, and a microprocessor. The radiotelephone portion can also include a paging receiver. The electronics incorporated into a cellular phone, two-way radio or selective radio receiver, such as a pager, are well known in the art, and can be incorporated into the communication device of the present invention.

Many types of digital communication devices can use the present invention to advantage. By way of example only, the communication device is embodied in a cellular phone having a conventional cellular radio transceiver circuitry, as is known in the art, and will not be presented here for simplicity. The cellular telephone, includes conventional cellular phone hardware (also not represented for simplicity) such as processors and user interfaces that are integrated in a compact housing, and further includes microprocessing and digital processing circuitry, in accordance with the present invention. Each particular wireline or wireless device will offer opportunities for implementing this concept and the means selected for each application. It is envisioned that the present invention is best utilized in GSM or DCS version of a digital cellular telephone as described below.

A series of specific embodiments are presented, ranging from the abstract to the practical, which illustrate the application of the basic precepts of the invention. Different embodiments will be included as specific examples. Each of which provides an intentional modification of, or addition to, the method and apparatus described herein.

The Mobile Station Application Execution Environment (MExE) defines a system for service providers and mobile stations to transfer information. In particular, 3GPP TS 23.057, "3rd Generation Partnership Project; Technical Specification Group Terminals; Mobile Station Application Execution Environment (MExE); Functional description; Stage 2 (Release 4), version 4.0.0, (2000-12), Section 4.7 describes the transfer of user preferences and mobile station capabilities, which is incorporated herein by reference.

In order that a meaningful transfer is made, i.e. the mobile station can properly utilize and present the transferred information in a preferred manner, the service provider and mobile station must know each other's capability and available content. This is accomplished with a capability negotiation between the service provider and the mobile station, and additionally by a content negotiation. The characteristic capabilities can include items such as classmark, screen size, color capability, audio and video capability, character information, resolution, software support, and the like. Moreover, user preferences can be part of the capability negotiations.

The capability negotiation can be originated by the mobile station or the service provider. For example, where a mobile station requests a download of content from a particular Uniform Resource Locator (URL), the mobile station will address the service provider network, the mobile station will transfer what capabilities and preferences the mobile has, and the service provider will tailor the content that it is to present. On the other hand, where a service provider has unsolicited information to be downloaded to a mobile station, the service provider network will address the mobile station and ask the mobile station what capabilities and preferences it has so that proper transfer can be made. Generally, the capability negotiation and addressing is carried out using Short Messaging Service (SMS), as is known in the art.

Typically, capability negotiation includes a transfer of a resource description framework (RDF) file that includes a description of the preferences and capabilities of the mobile station. The RDF file is structured in a particular syntax such that any particular piece of information in the RDF file can be quickly obtained by parsing the file according to its syntax. In this way, the RDF can be easily edited to update capabilities or user preferences. In the prior art, the mobile station has a resident editing program to parse the RDF file to extract the pertinent capability and user preference information and edit it. Typically, the editing program is 70 kilobytes in size, for a C programming implementation, and is stored in non-volatile memory of the mobile station. Unfortunately, keeping the editing program resident in the mobile station consumes nonvolatile memory resources. In particular, the editing program is utilized only occasionally, to change capabilities or user preferences, and sits idle most of the time. Inasmuch as mobile stations have finite memory resources, and many applications vying for that memory, this is wasteful of memory resources. Not only is non-volatile memory limited, random access memory (RAM) is even further limited forcing the editing program to remain resident on the mobile station.

The present invention seeks to free up mobile station memory resources by keeping an editing application resident on the service provider network instead of the mobile station, and downloading the editing application to the mobile station only as needed. Not only does this free up memory in the mobile station, it also provides a mechanism for the service provider to maintain and upgrade the functionality of the editing application and have the upgraded version available to all mobile stations instead of individually upgrading editing applications in each mobile station. Ordinarily, a download of the editing application would require recompilation of the editing application before execution, requiring extra memory resources over that of having a resident editing program. However, the recent introduction of the Java 2 Micro Edition (J2ME) kJava VM (virtual machine) environment from Sun Microsystem, allows executable (compiled) applications to be downloaded and automatically executed on mobile stations without utilizing additional memory resources over that of having the program resident in memory. The J2ME environment allows any application written with a kJava application programming interface (API) to be portable to any device running the kJava VM, and thus provides for a portable and executable version of the editing application to be used, furthering the advantage of having the editing application stored on the service provider network, in accordance with the present invention.

In practice, the present invention is implemented when dynamic verification of RDF file contents is required. For example, in a GSM mobile station a user could have the RDF file containing the capability information stored on a SIM card. If that user then removes the SIM card and installs it in a new mobile station and a capability request is received from the service provider, then the contents of the RDF file should be verified by the mobile station first because the new mobile station may have different screen size, etc. which can mandate changing of the RDF file contents. This would require an editing application on the mobile station that would have to understand/parse the RDF file and be able to dynamically check the mobile station capabilities and update the RDF file before sending it to the service provider. Preferably, this editing application is written in J2ME/kJava and stored remotely on the service provider network so that it can be automatically downloaded, installed and executed by the mobile station when needed. After the RDF file is updated then the editing application can be removed from the mobile station freeing up memory.

In place of the prior art mobile resident editing program, and to provide compatibility, the mobile station can have a much smaller resident prompt program that can identify when a RDF transfer request from the service provider occurs, and directs the editing application to be downloaded to the mobile station to properly update the RDF file before sending it to the service provider. Afterwards, the mobile station has the option to purge the editing application to reclaim memory. Since capability negotiation is an infrequent event, the extra time needed to accomplish editing an RDF file (i.e., downloading the editing file before updating the RDF file) is well worth the memory savings of about 70 kbytes, or about 3% of non-volatile memory in a typical mobile station.

Referring to FIG. 1, the present invention describes an apparatus 10 for updating capability negotiation information in a communication system running with a Mobile Station Application Execution environment (MExE). The apparatus includes a mobile station 12 with a memory. A service provider network 14 is available to provide content 16, such as an Internet web page for example, from a URL to the mobile station 12. The mobile station 12 also provides capability negotiation information, in the form of a RDF file 20, to the service provider 14 to define the capabilities of the mobile station 12. The capability negotiation information (RDF file) provides format information of the content and helps the mobile station and service provide negotiate a transfer of the content in a format for proper presentation in the mobile station. User preferences contained in a user profile 24 can also be provided to the service provider to enhance content delivery. The user profile can be contained within the RDF file or provided in a separate file. The RDF file 20 along with the user profile 24 can be resident in the mobile station 12, contained on a removable SIM card (not shown), or stored remotely on the service provider network 14.

A novel aspect of the invention is having an editing application 18 resident on the service provider network 14 instead of residing full-time on the mobile station. The editing application is used by the mobile station to interpret the capability negotiation information (i.e. parse the RDF file) and to provide upgrades. Preferably, the editing application is implemented as a Java component, such as J2ME in the kJava VM environment, providing portability such that the editing application can be dynamically downloaded, installed and executed whenever there are changes in the mobile station capabilities or user preferences, which can be included in the capability negotiation information in the form of a RDF file, for example. Before a transfer of content 16 via the service provider network 14 to the mobile station 12, the editing application 18 is downloaded to the mobile station 12 memory, installed and executed to update the capability negotiation information 20 subsequently downloaded from the service provider network 14 to the mobile station 12. This is done such that the pertinent capability negotiation information 20 can be determined to enable proper transfer and presentation of the content 16 from the service provider 14 to the mobile station 12 in the desired format. After the editing application has been used to update the capability negotiation information, the mobile station can purge the editing application from memory to free up its memory resources.

Along these lines, it should be noted that the mobile station can not only download the editing application, but can dynamically download, install and execute any portable application from the service provider network as needed and without recompilation. This is particularly useful where the mobile station runs a kJava VM environment.

In a preferred embodiment, the apparatus 10 includes a prompt program 22 resident in the mobile station 12, wherein before transfer of the capability negotiation information 20 or user profile 24 to the service provider network 14 from the mobile station 12, the prompt program 22 directs the service provider network 14 to download the editing application 18 to the mobile station 12. At this point, the mobile station 12 can install and execute the editing application 18 to update the capability negotiation information 20 or user profile 24. Part of the editing application includes parsing the RDF file to determine the pertinent parts of the negotiation information.

Figure 2:
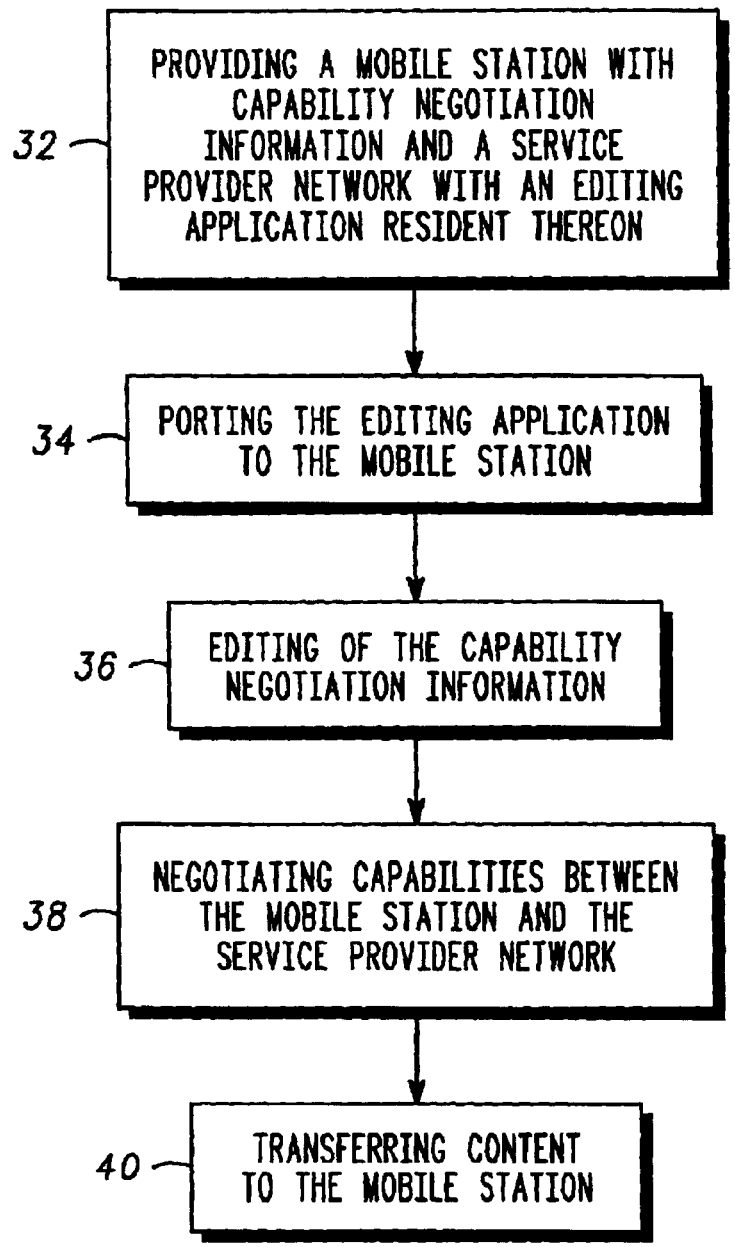
FIG. 2 illustrates a flow chart of a method for updating capability negotiation, in accordance with the present invention.

Referring to FIG. 2, the present invention also provides a method 30 for providing capability negotiations in a communication system running with a Mobile Station Application Execution environment (MExE). The method includes a first step 32 of providing a mobile station with capability negotiation information and a memory, and a service provider network with an editing application resident thereon. Preferably, this step 32 includes a prompt program resident on the memory. More preferably, the mobile station is provided running a kJava VM environment. The service provider network provides for the transferring of content, such as an Internet web page from a URL, to the mobile station. A next step 34 includes porting the editing application from the service provider to the mobile station. Preferably, this occurs upon a prompt from the prompting program. The porting step 34 includes downloading, installing and executing the editing application. Preferably, the editing application is implemented as a Java component providing portability such that the porting step 34 can occur dynamically. A next step 36 includes editing (e.g. parsing) of the capability negotiation information by the editing application. A next step 38 includes negotiating capabilities between the mobile station and the service provider network using the pertinent edited information from the editing step 36 to arrive at an agreed transfer format for the content. A next step 40 includes transferring the content via the service provider network to the mobile station in the negotiated format for proper presentation in the mobile station. Optionally, a further step includes purging the editing application from the memory of the mobile station anytime after the editing step so as to free up memory resources in the mobile station.

It should be noted that the present invention also encompasses the steps of dynamically downloading and automatically executing any portable application, and not just the editing application, from the service provider network to the mobile station, as needed, and without recompilation.

While the foregoing described embodiments have been set forth above, it will be appreciated to one skilled in the art that the invention described has applications beyond the described embodiments. Accordingly, it is intended that the scope of the invention including such alternatives, modifications, and variations contemplated shall be defined by the appended claims.

What is claimed is:

1. An apparatus for updating capability negotiation information in a communication system running with a Mobile Station Application Execution environment (MExE), the apparatus comprising:
    a mobile station with a memory;
    a service provider network to provide content to the mobile station;
    capability negotiation information to be provided by the mobile station to the service provider network; and
    an editing application that is resident on the service provider network, wherein before a transfer of content to the mobile station, the editing application is downloaded to the mobile station, installed and executed to update the capability negotiation information with any changes to enable proper transfer and presentation of the content from the service provider to the mobile station.

2. The apparatus of claim 1, wherein the mobile station runs a kJava VM environment.

3. The apparatus of claim 2, wherein the editing application is implemented as a Java component providing portability.

4. The apparatus of claim 1, wherein the capability negotiation information is a resource description format (RDF) file and the editing application edits the RDF file.

5. The apparatus of claim 1, wherein the capability negotiation information includes user preferences.

6. The apparatus of claim 1, further comprising a prompt program resident in the mobile station, wherein before transfer of the capability negotiation information from the mobile station to the service provider network, the prompt program directs the service provider network to download the editing application to the mobile station, whereupon the mobile station installs and executes the editing application to update the capability negotiation information.

7. The apparatus of claim 1, wherein the mobile station dynamically downloads, installs and executes the editing application whenever there are changes in one of the group of mobile station capabilities and user preferences.

8. The apparatus of claim 1, wherein the mobile station purges the editing application from memory after the after the capability negotiation information has been updated.

9. An apparatus for providing capability negotiations in a communication system running with a Mobile Station Application Execution environment (MExE), the apparatus comprising:
    a mobile station with a memory and kJava VM environment (virtual machine) resident thereon;
    a service provider network to provide content to the mobile station;
    capability negotiation information to be provided by the mobile station to the service provider network;
    a editing application resident on the service provider network, the editing application being portable to the mobile station; and
    a prompt program resident in the mobile station, wherein before transfer of the capability negotiation information to the service provider network from the mobile station, the prompt program directs the service provider network to download the editing application to the mobile station, whereupon the mobile station installs and executes the editing application to update the capability negotiation information to enable proper transfer and presentation of the content from the service provider to the mobile station.

10. The apparatus of claim 9, wherein the editing application is implemented as a Java component providing portability.

11. The apparatus of claim 9, wherein the capability negotiation information is a resource description format (RDF) file and the editing application parses the RDF file.

12. The apparatus of claim 9, wherein the capability negotiation information includes user preferences.

13. The apparatus of claim 9, wherein the mobile station dynamically downloads, installs and executes the editing application whenever there are changes in one of the group of mobile station capabilities and user preferences.

14. The apparatus of claim 9, wherein the mobile station purges the editing application from memory after the transfer of content from the service provider.

15. A method for providing capability negotiations in a communication system running with a Mobile Station Application Execution environment (MExE), the method comprising the steps of:
    providing a mobile station with capability negotiation information, a memory, and a service provider network with an editing application resident thereon, the service provider network for transferring content to the mobile station;
    porting the editing application from the service provider to the mobile station;
    editing of the capability negotiation information by the editing application;
    negotiating capabilities between the mobile station and the service provider network; and
    transferring content in a proper format for presentation in the mobile station.

16. The method of claim 15, wherein the providing step includes providing a prompt program resident on the mobile station memory, and wherein the porting step occurs upon a prompt from the prompting program.

17. The method of claim 15, wherein, in the porting step, the editing application is implemented as a Java component providing portability, and wherein in the providing step, the mobile station runs a kJava VM environment.

18. The method of claim 15, wherein, in the providing step, the capability negotiation information includes a resource description format (RDF) file.

19. The method of claim 15, wherein, in the providing step the capability negotiation information includes user preferences.

20. The method of claim 15, further comprising the step of purging the editing application from the memory of the mobile station anytime after the editing step.

* * * * *